United States Patent
Chen

(10) Patent No.: US 8,702,232 B2
(45) Date of Patent: Apr. 22, 2014

(54) ASSEMBLY OF FRAME AND LENS FOR GLASSES

(76) Inventor: Lin Yun Chen, Tainan (TW)

(*) Notice: Subject to any disclaimer, the term of this patent is extended or adjusted under 35 U.S.C. 154(b) by 37 days.

(21) Appl. No.: 13/602,408

(22) Filed: Sep. 4, 2012

(65) Prior Publication Data

US 2013/0293829 A1 Nov. 7, 2013

(30) Foreign Application Priority Data

May 2, 2012 (TW) .............................. 101208246 U

(51) Int. Cl.
*G02C 5/02* (2006.01)
*G02C 5/16* (2006.01)
*G02C 3/04* (2006.01)
*G02C 5/22* (2006.01)
*G02C 5/14* (2006.01)

(52) U.S. Cl.
CPC .. *G02C 5/02* (2013.01); *G02C 5/16* (2013.01); *G02C 3/04* (2013.01); *G02C 5/14* (2013.01); *G02C 5/22* (2013.01)
USPC ........... 351/133; 351/111; 351/112; 351/113; 351/114

(58) Field of Classification Search
CPC ............ G02C 5/143; G02C 5/02; G02C 5/16; G02C 3/04; G02C 5/2254
USPC ........................................ 351/111–114, 133
See application file for complete search history.

(56) References Cited

U.S. PATENT DOCUMENTS

| | | | |
|---|---|---|---|
| 5,587,747 A * | 12/1996 | Bernheiser | .................... 351/105 |
| 2003/0223032 A1* | 12/2003 | Gagnon et al. | .................. 351/92 |
| 2009/0219481 A1* | 9/2009 | Lamontagne et al. | ........ 351/114 |

* cited by examiner

*Primary Examiner* — Scott J Sugarman
*Assistant Examiner* — Daniele Manikeu
(74) *Attorney, Agent, or Firm* — Rosenberg, Klein & Lee

(57) ABSTRACT

An assembly for glasses includes a frame having a top rod. A seat is formed on a bottom of the top rod. The seat includes a first engagement hole having first and second wider portions and a narrower portion located between the first and second wider portions. A first connecting rod extends from a top of a bridge and has a protrusion received in one of the first and second wider portions. The first protrusion is forcibly passable through the narrower portion into the other of the first and second wider portions, allowing adjustment in a spacing between the bridge and the top rod. Two grooves are defined in the bottom of the top rod. An abutment portion is formed in each groove. Two lenses are respectively received in the grooves. Each lens includes a protruded portion abutting the abutment portion of one of the grooves.

4 Claims, 4 Drawing Sheets

ASSEMBLY OF FRAME AND LENS FOR GLASSES

BACKGROUND OF THE INVENTION

The present invention relates to an assembly of a frame and lenses for glasses and, more particularly, to an assembly of a frame and two lenses for glasses.

Glasses can correct eyesight or shield eyes of users from sunlight, wind, and sand. Glasses generally include a frame, at least one lens, and two temples. Replacement of a whole pair of glasses is not necessary now. Specifically, glasses can be repaired by replacing the lenses or temples. As an example, only replacement of lenses is needed if the lenses are worn or the vision of the degree of myopia of a user increases.

Taiwan Utility Model No. M348958 discloses an assembly of a frame and a lens unit for glasses that allows multiple-stage adjustment in tightness of the lens unit to provide easy assemblage between the frame and the lens unit. Specifically, the glasses include a frame with a top rod to which a bridge is mounted. The top rod includes a bottom edge having an outer side with a groove, with the groove having a downwardly facing opening. A support portion extends from the bridge. The support portion is in the form of a support groove having an upwardly facing opening. The lens unit includes two lenses integrally formed with each other via a neck between the lenses. The neck of the one-piece lens unit is received between the groove and the support groove to complete assemblage. However, the whole lens unit must be replaced with a new one even though only one of the lenses is worn. A lens unit with two separate lenses does not include the bridge and, thus, can not be received between the groove and the support groove. Thus, the lens unit with two separate lenses is not suitable for the frame of this type.

Thus, a need exists for novel glasses that mitigate and/or obviate the above disadvantages.

BRIEF SUMMARY OF THE INVENTION

An assembly for glasses according to the present invention includes a frame having a top rod. A bridge is connected to the frame. A seat is formed on a bottom of the top rod. The seat includes a first engagement hole, with the first engagement hole including a first wider portion, a second wider portion, and a narrower portion located between the first and second wider portions in a vertical direction. A first connecting rod extends from a top of the bridge. A first protrusion is formed on an upper end of the first connecting rod. Each of the first protrusion, the first wider portion, the second wider portion, and the narrower portion has a width in a direction perpendicular to the vertical direction. The width of the first protrusion is smaller than the width of the first wider portion and slightly larger than the width of the second wider portion. The width of the second wider portion is slightly larger than the width of the narrower portion. The first protrusion is received in one of the first and second wider portions. The first protrusion is forcibly passable through the narrower portion into the other of the first and second wider portions by resiliency of the first protrusion, allowing adjustment in a spacing between the bridge and the top rod in the vertical direction. The lenses are in tight coupling with the frame when the first protrusion is in the first wider portion. The lenses are in loose coupling with the frame when the first protrusion is in the second wider portion. First and second grooves are respectively defined in right and left sections of the bottom of the top rod. Each of the first and second grooves has a downwardly facing opening and a distal end away from the bridge. A first abutment portion is formed on the distal end of the first groove. A second abutment portion is formed on the distal end of the second groove. The bridge includes two shoulders respectively having third and fourth abutment portions. First and second lenses are respectively received in the first and second grooves. Each of the first and second lenses includes an outer side away from the bridge and an inner side adjacent to the bridge. The outer side of the first lens has a first protruded portion. The outer side of the second lens has a second protruded portion. The first protruded portion abuts the first abutment portion. The second protruded portion abuts the second abutment portion. A third protruded portion is formed on the inner side of the first lens and abuts the third abutment portion. A fourth protruded portion is formed on the inner side of the second lens and abuts the fourth abutment portion.

In addition to adjustment of the coupling tightness of the lenses allowing easy assemblage of the frame and the lenses, the present invention is suitable for two lenses separate from each other. When only one of the first and second lenses wears or has to be changed due to an increase or decrease in the degree of an eye of a user, replacement of only one lens is required.

The bridge may include a second connecting rod, and the seat may include a second engagement hole having first and second wider portions and a narrower portion between the first and second wider portions.

The present invention will become clearer in light of the following detailed description of illustrative embodiments of this invention described in connection with the drawings.

DETAILED DESCRIPTION OF THE INVENTION

Figure 1:
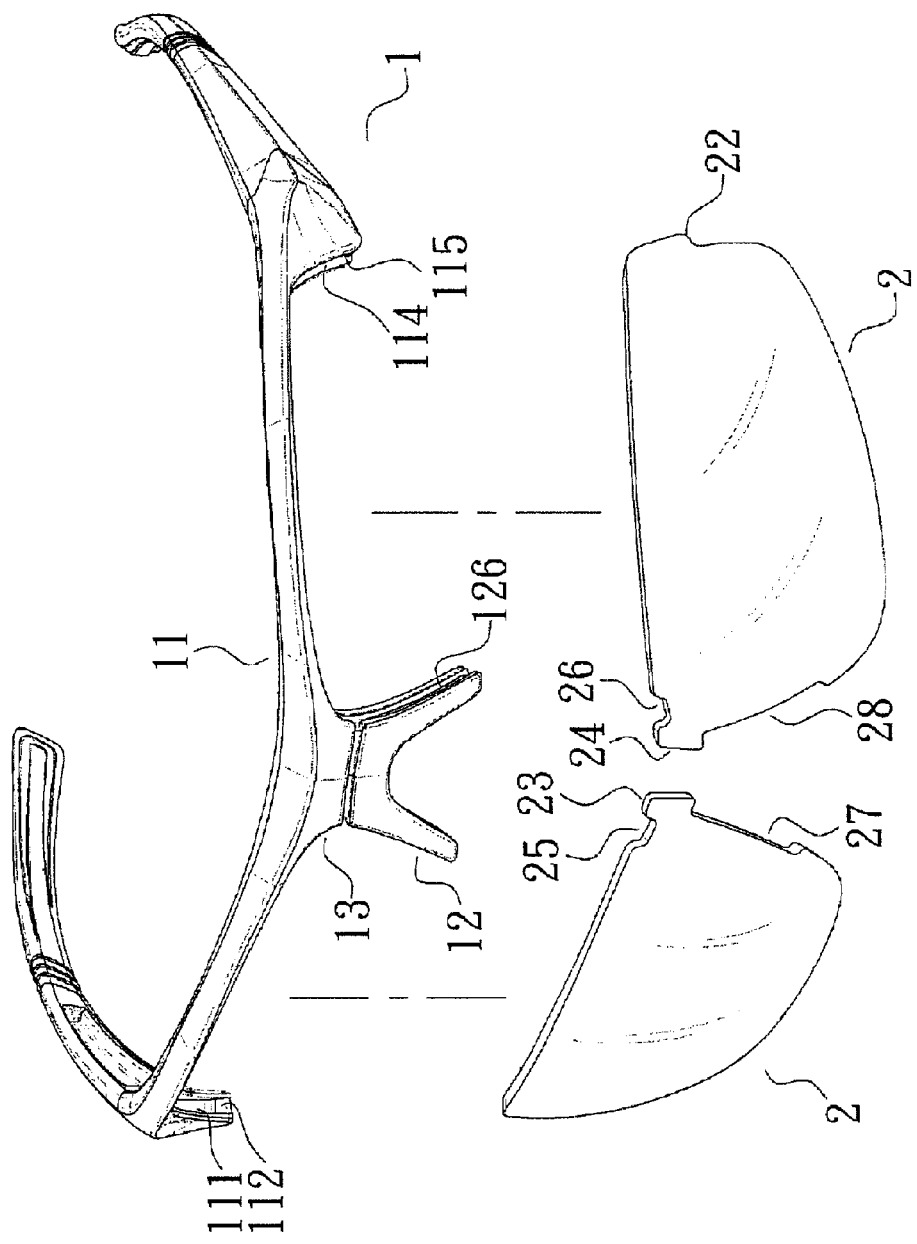
FIG. 1 shows an exploded, perspective view of an embodiment of an assembly of a frame and two lenses for glasses according to the present invention.
Figure 2:
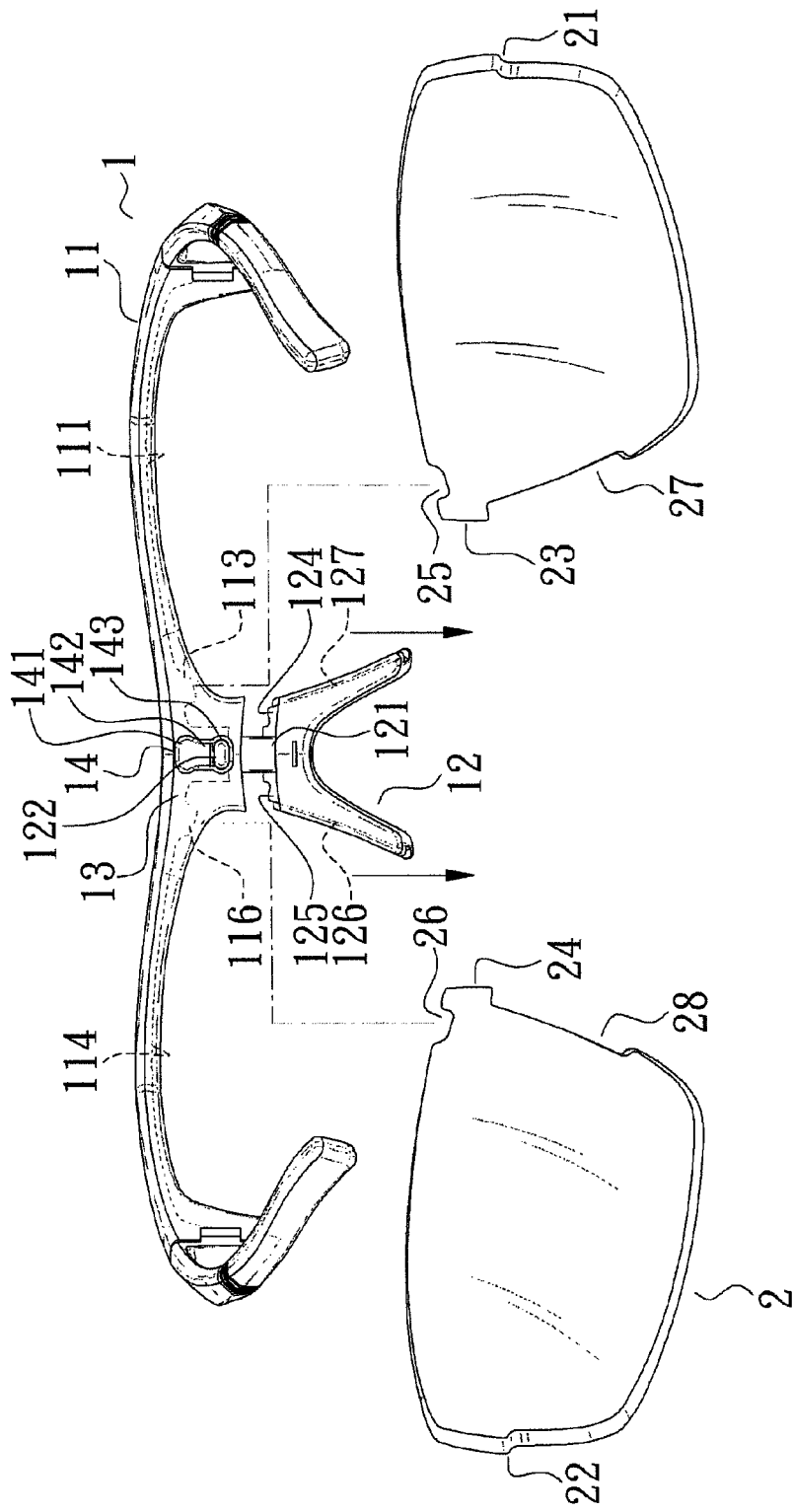
FIG. 2 shows another exploded, perspective view of the assembly of FIG. 1, with a protrusion engaged in a first engagement hole.

With reference to FIG. 1, an assembly of a frame and two lenses for glasses according to the present invention includes a frame 1 and two lenses 2. With reference to FIG. 2, the frame 1 includes a top rod 11 to which a bridge 12 is mounted. A seat 13 is formed on a bottom of the top rod 11 and includes a first engagement hole 14. The first engagement hole 14 includes a first wider portion 141, a second wider portion 143, and a narrower portion 142 located between the first and second wider portions 141 and 143 in a vertical direction. A first connecting rod 121 extends from a top of the bridge 12. A first protrusion 122 is formed on an upper end of the first connecting rod 121. First and second grooves 111 and 114 are respectively defined in right and left sections of the bottom of the top rod 11, with each of the first and second grooves 111 and 114 having a downwardly facing opening. Each of the first and second grooves 111 and 114 includes a distal end away from the bridge 12, with a first abutment portion 112 formed on the distal end of the first groove 111, with a second abutment portion 115 formed on the distal end of the second groove 114. The bridge 12 includes two shoulders respectively having third and fourth abutment portions 124 and 125.

First and second lenses 2 are respectively received in the first and second grooves 111 and 114. Each of the first and second lenses 2 includes an outer side away from the bridge 12 and an inner side adjacent to the bridge 12. The outer side of the first lens 2 has a first protruded portion 21. The outer side of the second lens 2 has a second protruded portion 22. The first protruded portion 21 abuts the first abutment portion 112. The second protruded portion 22 abuts the second abutment portion 115. A third protruded portion 23 is formed on the inner side of the first lens 2. A fourth protruded portion 24 is formed on the inner side of the second lens 2. The third protruded portion 23 abuts the third abutment portion 124. The fourth protruded portion 24 abuts the fourth abutment portion 125.

Figure 3:
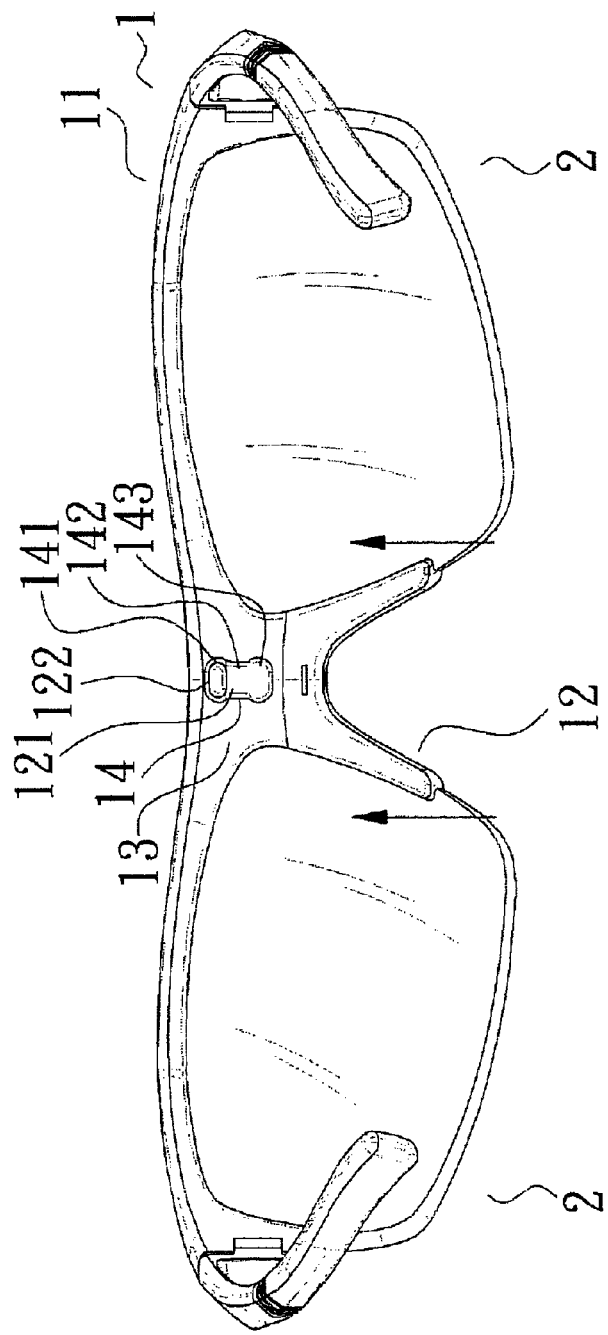
FIG. 3 shows a perspective view of the assembly of FIG. 1.

With reference to FIGS. 2 and 3, each of the first protrusion 122, the first wider portion 141, the second wider portion 143, and the narrower portion 142 has a width in a direction perpendicular to the vertical direction. The width of the first protrusion 122 is smaller than the width of the first wider portion 141 and slightly larger than the width of the second wider portion 143. The width of the second wider portion 143 is slightly larger than the width of the narrower portion 142. The first protrusion 122 is received in one of the first and second wider portions 141 and 143. The first protrusion 122 is forcibly passable through the narrower portion 142 into the other of the first and second wider portions 141 and 143 by resiliency of the first protrusion 122, allowing adjustment in a spacing between the bridge 12 and the top rod 11 in the vertical direction. The lenses 2 are in tight coupling with the frame 1 when the first protrusion 122 is in the first wider portion 141, not allowing detachment of the lenses 2. The lenses 2 are in loose coupling with the frame 1 when the first protrusion 122 is in the second wider portion 143, allowing detachment of the lenses 2.

With reference to FIGS. 1 and 2, each of the first and second lenses 2 further includes a top edge extending between the inner and outer sides thereof. The top edge of the first lens 2 includes a first recessed portion 25. The top edge of the second lens 2 includes a second recessed portion 26. A fifth protruded portion 113 is formed in the first groove 111. A sixth protruded portion 116 is formed in the second groove 114. The first recessed portion 25 is engaged with the fifth protruded portion 113. The second recessed portion 26 is engaged with the sixth protruded portion 116. Thus, the assemblage between the frame 1 and the lenses 2 is more reliable. The bridge 12 further includes third and fourth grooves 126 and 127 on two lateral edges thereof. The first lens 2 includes a third recessed portion 27 engaged in the third groove 126. The second lens 2 includes a fourth recessed portion 28 engaged in the fourth groove 127.

With reference to FIG. 2, each of the third and fourth abutment portions 124 and 125 including a top edge having a recess for engagement with the third and fourth protruded portions 23 and 24 of the first and second lenses 2, providing more reliable assemblage between the frame 1 and the lenses 2.

The first protrusion 122 may be formed on an inner side of the first connecting rod 121, as shown in FIGS. 2 and 3.

Figure 4:
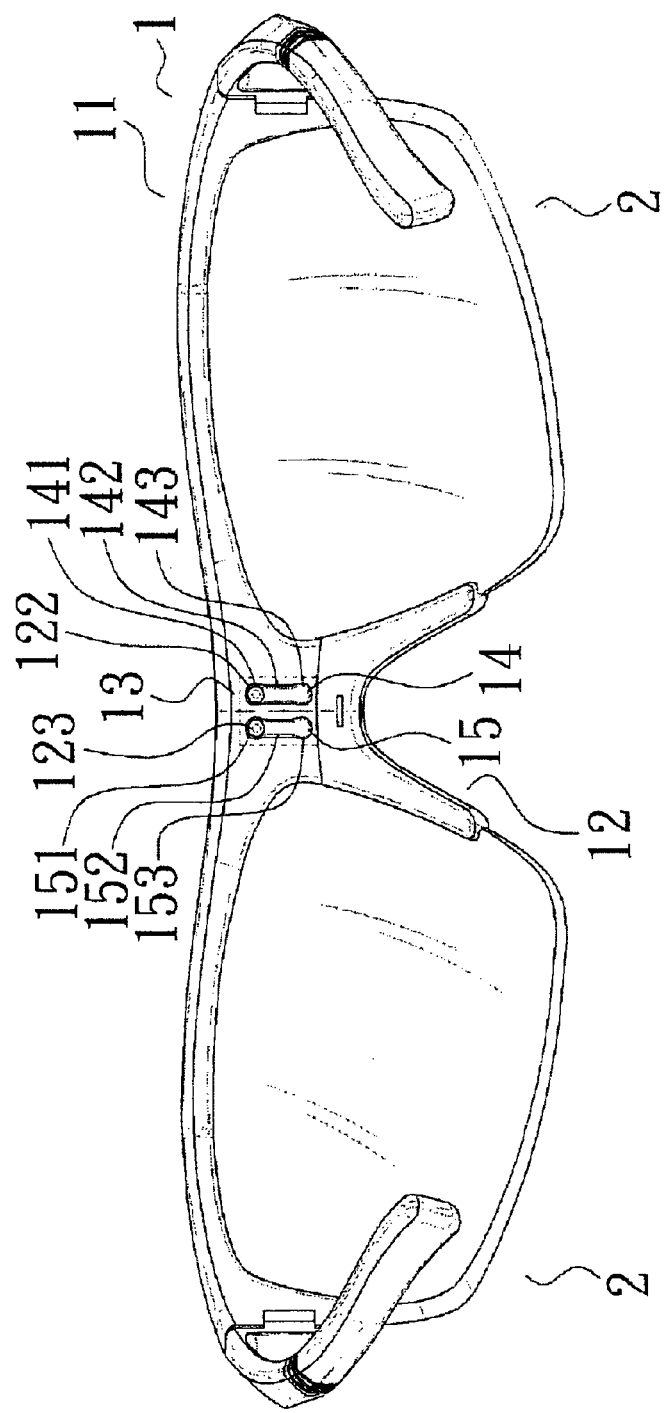
FIG. 4 shows a perspective view of another embodiment of the assembly of a frame and two lenses for glasses according to the present invention.

With reference to FIG. 4, to allow more reliable movement of the bridge 12 during adjustment, the bridge 12 can further include a second connecting rod 121, with the first and second connecting rods 121 parallel to and spaced from each other. A second protrusion 123 is formed on an upper end of the second connecting rod 121. The seat 13 further includes a second engagement hole 15, with the second engagement hole 15 and the first engagement hole 14 parallel to and spaced from each other. The second engagement hole 15 includes a first wider portion 151, a second wider portion 153, and a narrower portion 152 located between the first and second wider portions 151 and 153 of the second engagement hole 15 in a vertical direction. Each of the second protrusion 153, the first wider portion 151, the second wider portion 153, and the narrower portion 152 of the second engagement hole 15 having a width in a direction perpendicular to the vertical direction. The width of the second protrusion 153 of the second engagement hole 153 is smaller than the width of the first wider portion 151 of the second engagement hole 15 and slightly larger than the width of the second wider portion 153 of the second engagement hole 15. The width of the second wider portion 153 of the second engagement hole 15 is slightly larger than the width of the narrower portion 152 of the second engagement hole 15. The second protrusion 123 is received in one of the first and second wider portions 151 and 153 of the second engagement hole 15. The second protrusion 123 is forcibly passable through the narrower portion 152 of the second engagement hole 15 into the other of the first and second wider portions 151 and 153 of the second engagement hole 15 by resiliency of the second protrusion 123, allowing adjustment in the spacing between the bridge 12 and the top rod 11 in the vertical direction. The lenses 2 are in tight coupling with the frame 1 when the second protrusion 123 is in the first wider portion 151 of the second engagement hole 15. The lenses 2 are in loose coupling with the frame 1 when the second protrusion 123 is in the second wider portion 153 of the second engagement hole 15.

In addition to adjustment of the coupling tightness of the lenses 2 allowing easy assemblage of the frame 1 and the lenses 2, the present invention is suitable for two lenses 2 separate from each other. When only one of the first and second lenses 2 wears or has to be changed due to an increase or decrease in the degree of an eye of a user, replacement of only one lens 2 is required.

Although specific embodiments have been illustrated and described, numerous modifications and variations are still possible without departing from the essence of the invention. The scope of the invention is limited by the accompanying claims.

The invention claimed is:

1. An assembly for glasses, with the assembly comprising: a frame including a top rod, with a bridge connected to the frame, with the top rod including a bottom, with a seat formed on the bottom of the top rod, with the seat including a first engagement hole, with the first engagement hole including a first wider portion, a second wider portion, and a narrower portion located between the first and second wider portions in a vertical direction, with a first connecting rod extending from a top of the bridge and having an upper end, with a first protrusion formed on the upper end of the first connecting rod, each of the first protrusion, the first wider portion, the second wider portion, and the narrower portion having a width in a direction perpendicular to the vertical direction, with the width of the first protrusion being smaller than the width of the first wider portion and slightly larger than the width of the second wider portion, with the width of the second wider portion being slightly larger than the width of the narrower portion, with the first protrusion received in one of the first and second wider portions, with the first protrusion forcibly passable through the narrower portion into the other of the first and second wider portions by resiliency of the first protrusion, allowing adjustment in a spacing between the bridge and the top rod in the vertical direction, with the lenses being in tight coupling with the frame when the first protrusion is in the first wider portion, with the lenses being in loose coupling with the frame when the first protrusion is in the second wider portion, with the bottom of the top rod including right and left sections, with first and second grooves respectively defined in the right and left sections, with each of the first and second grooves having a downwardly facing opening, with each of the first and second grooves including a distal end away from the bridge, with a first abutment portion formed on the distal end of the first groove, with a second abutment portion formed on the distal end of the second groove, with the bridge including two shoulders respectively having third and fourth abutment portions; and first and second lenses respectively received in the first and second grooves, with each of the first and second lenses including an outer side away from the bridge and an inner side adjacent to the bridge, with the outer side of the first lens having a first protruded portion, with the outer side of the second lens having a second protruded portion, with the first protruded portion abutting the first abutment portion, with the second protruded portion abutting the second abutment portion, with a third protruded portion formed on the inner side of the first lens, with a fourth protruded portion formed on the inner side of the second lens, with the third protruded portion abutting the third abutment portion, with the fourth protruded portion abutting the fourth abutment portion.

2. The assembly as claimed in claim 1, with each of the first and second lenses further including a top edge extending between the inner and outer sides thereof, with the top edge of the first lens including a first recessed portion, with the top edge of the second lens including a second recessed portion, with a fifth protruded portion formed in the first groove, with a sixth protruded portion formed in the second groove, with the first recessed portion engaged with the fifth protruded portion, with the second recessed portion engaged with the sixth protruded portion.

3. The assembly as claimed in claim 1, with the each of the third and fourth abutment portions including a top edge having a recess.

4. The assembly as claimed in claim 1, with the bridge further including a second connecting rod having an upper end, with the first and second connecting rods parallel to and spaced from each other, with a second protrusion formed on the upper end of the second connecting rod, with the seat further including a second engagement hole, with the second engagement hole including a first wider portion, a second wider portion, and a narrower portion located between the first and second wider portions of the second engagement hole in a vertical direction, each of the second protrusion, the first wider portion, the second wider portion, and the narrower portion of the second engagement hole having a width in a direction perpendicular to the vertical direction, with the width of the second protrusion of the second engagement hole being smaller than the width of the first wider portion of the second engagement hole and slightly larger than the width of the second wider portion of the second engagement hole, with the width of the second wider portion of the second engagement hole being slightly larger than the width of the narrower portion of the second engagement hole, with the second protrusion received in one of the first and second wider portions of the second engagement hole, with the second protrusion forcibly passable through the narrower portion of the second engagement hole into the other of the first and second wider portions of the second engagement hole by resiliency of the second protrusion, allowing adjustment in the spacing between the bridge and the top rod in the vertical direction. with the lenses being in tight coupling with the frame when the second protrusion is in the first wider portion of the second engagement hole, with the lenses being in loose coupling with the frame when the second protrusion is in the second wider portion of the second engagement hole.

* * * * *